Figure 1:
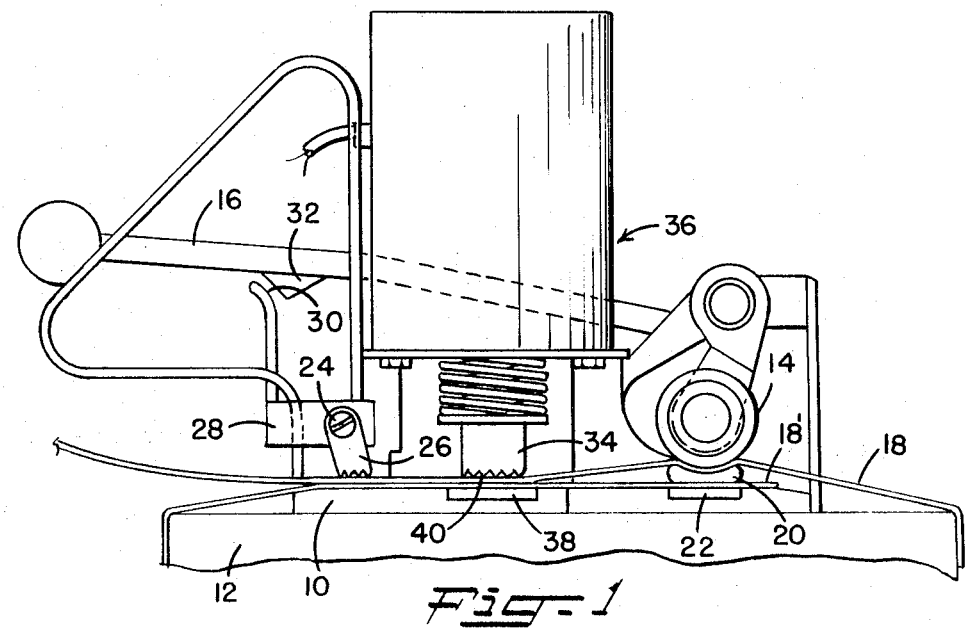

United States Patent [19]
Schoening

[11] 3,873,387
[45] Mar. 25, 1975

[54] STRAP LOOP SECURING AND SEVERING MEANS

[75] Inventor: Jerry M. Schoening, San Jose, Calif.

[73] Assignee: FMC Corporation, Philadelphia, Pa.

[22] Filed: July 5, 1973

[21] Appl. No.: 376,687

[52] U.S. Cl................. 156/73.5, 29/470.3, 156/251, 156/306, 156/580, 264/68
[51] Int. Cl............................................ B32b 31/20
[58] Field of Search ............ 156/73, 580, 306, 251; 29/470.3; 264/68

[56] References Cited
UNITED STATES PATENTS

| | | | |
|---|---|---|---|
| 3,442,733 | 5/1969 | Vilcins | 156/73 |
| 3,442,734 | 5/1969 | Ericsson | 156/73 |
| 3,554,845 | 11/1971 | Billett et al. | 156/580 |
| 3,554,846 | 1/1971 | Billett | 156/580 |
| 3,709,758 | 1/1973 | Gilmore | 156/494 |
| 3,777,967 | 12/1973 | Searle et al. | 156/73 X |

Primary Examiner—Edward G. Whitby

[57] ABSTRACT

Method and apparatus for securing plastic strapping about an article includes forming a friction welded joint in overlapping portions of the strapping looped about the article and severing the loop from a supply of strapping by rapidly flexing the strapping adjacent the joint during the friction welding operation. The rapid flexing causes the strapping to fail by fatigue.

6 Claims, 3 Drawing Figures

PATENTED MAR 25 1975　　　　　　　　　　　　　3,873,387

STRAP LOOP SECURING AND SEVERING MEANS

This invention relates to means for severing a loop of strapping sealed about an object from the strapping extending from the loop back to a supply. More particularly the invention relates to an improved method and apparatus for simultaneously friction welding overlapping portions of a loop, normally a tensioned loop, of high strength molecularly oriented plastic strapping, especially polypropylene strapping, and severing the tensioned loop from the strap supply adjacent the welded joint.

The patent to Gilmore, U.S. Pat. No. 3,709,758 describes an apparatus for forming a friction welded joint in a tensioned loop of plastic strapping and employing the friction producing mechanism to rub the upper strap portion against a stationary saw toothed blade so as to sever the sealed loop from the strap supply closely adjacent the joint. Another apparatus for simultaneously forming a friction welded joint in a loop of plastic strapping and severing the loop from the strap supply adjacent the joint is shown in the patent to Vilcins, U.S. Pat. No. 3,442,733. This latter patent employs a blade partially penetrating the upper strap portion across the width of the strap and causing heat to be concentrated in the top strap beneath the blade as the top strap is rubbed back and forth against the lower strap portion so as to melt the upper strap portion beneath the blade and thereby sever the sealed loop from the strap supply.

It is the primary object of the present invention to provide a method and an apparatus for severing a loop of plastic strapping from a supply adjacent a friction welded joint by flexing the strap during the welding operation rapidly along a predetermined line extending thereacross whereby severing is accomplished by internal heat of friction or fatigue.

Other and further objects, features and advantages of the invention will become apparent as the description of a preferred embodiment thereof proceeds.

Figure 2:
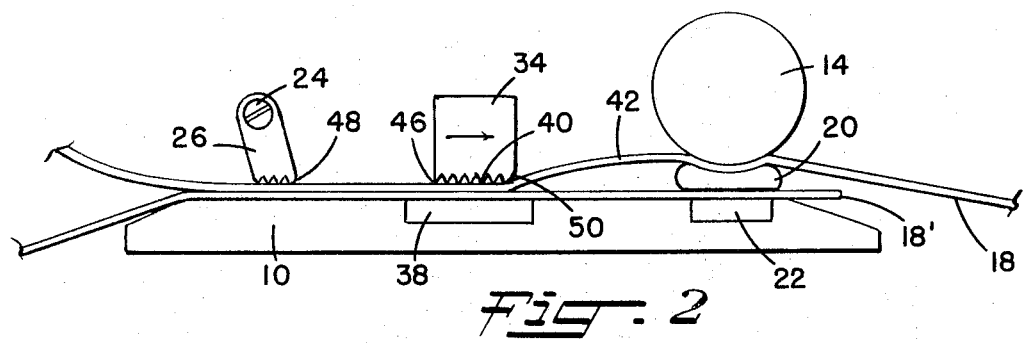
Figure 3:
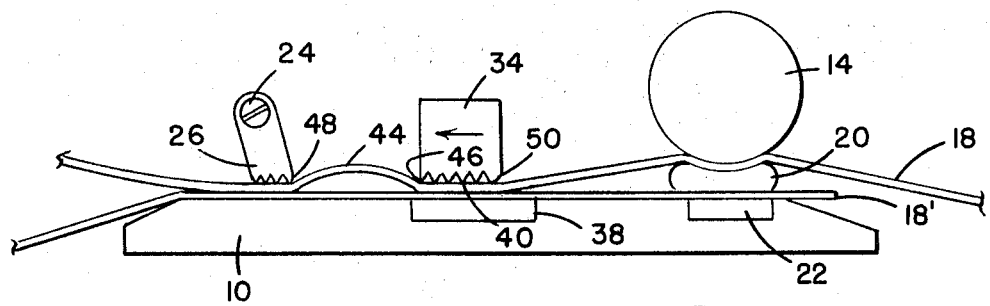

Referring now to the drawing:

FIG. 1 is a diagrammatic side elevation of a strapping tool embodying the invention; and FIGS. 2 and 3 are side elevational views demonstrating the manner of causing the strap to flex-break at the desired place.

As will become apparent to one skilled in the art, a variety of specifically different forms of apparatus may be employed for carrying out this invention and the accompanying drawing is only intended to diagrammatically illustrate one suitable form. As illustrated, the apparatus or tool comprises a base 10 adopted to rest during use on an article 12 to be strapped. Supported on the base of the tool is a strap tensioning mechanism in the form of a feed wheel 14 operated by oscillation of a lever 16 to tension a loop of plastic strapping 18 about article 12. This particular form of tensioning mechanism is well known in the art and is described, for example, in the patent to Billett et al., U.S. Pat. No. 3,554,845. Floatingly secured to the base of the tool and extending beneath feed wheel 14 is a member 20 and embedded in base 10 beneath said member is a strap gripper 22. Pivotally mounted on a pin 24 suitable secured to aa frame member of the tool is a strap gripping dog 26 secured to or formed integrally with which is an L-shaped operating lever 28 an upper curved end 30 of which lies on the path of a cam 32 secured to the feed wheel operating lever 16.

Located between and in a line with feed wheel 14 and dog 26 is the oscillatable strap gripping welding head 34 of a suitable friction welding mechanism generally designated 36. Secured in base 10 beneath welding head 34 is a bottom strap gripping element 38. The details of construction of the welding mechanism are not of the essence of the present invention. Such mechanism may, within the scope of this invention, be as described in the above-mentioned patent to Vilcins U.S. Pat. No. 3,442,733 or it may be a variation of the mechanism described in the aforesaid Billett et al. U.S. Pat. No. 3,554,845, or indeed may have a variety of forms so long as it performs the basic functions of selectively pressing the welding head 34 down against the strap and rapidly oscillating it longitudinally of the strap direction. While the invention may be carried out with apparatus where the welding head moves with an orbital motion as particularly described in the said Billett et al. patent, it is preferable that the head have a simple oscillatory motion so as to slide the upper run of the strap back and forth longitudinally against the lower run during the friction welding operation. When not in use, welding head 34 is elevated by suitable means not shown so as to leave space for overlapping portions of strapping to be inserted between it and the strap gripping element 38.

In use, the tool is placed against (usually on top of) the article or articles to be strapped and lever 16 is depressed to engage cam 32 with operating lever 28 and thereby elevate the dog 26 from engagement with the base of the tool. As explained in the Billett et al. U.S. pat. No. 3,554,845, depressing lever 16 also elevates tension wheel 14 and with welding head 34 also elevated the tool is ready to be loaded. A length of strapping is then pulled from a supply not shown and laced about the article 12. The leading end portion 18' of the strapping is inserted beneath member 20 and overlapping strap portions are placed beneath gripping dog 26 and welding head 34. A portion of the strapping is also inserted between feed wheel 14 and the upper surface of member 20. Oscillation of lever 16 is then employed to tension the strapping about the article, the first part of the movement of the lever being effective to permit feed wheel 14 to press the underlying portion of the strapping against the upper face of floating member 20 and cause the lower face of member 20 to squeeze the end portion 18' of the strapping between it and gripper 22. Likewise, the initial movement of lever 16 allows dog 26 to engage the strapping located therebeneath but during the tensioning operation while feed wheel 14 is moving the upper strap portion toward the left as viewed in the drawing, lever 28 is mannually operated to hold it out of contact with the strap, the pivotal mounting of the dog being such as to prevent the strap from moving therebeneath in the leftward direction when it is engaged with the strap. Upon completion of the tension operation dog 26 is allowed to engage the strap. With the strapping thus tensioned about the article, welding head 34 is pressed against the upper one of the overlapping strap portions located thereneath and caused to rapidly oscillate so as to rub the upper strap portion against the lower portion sufficiently rapidly and with sufficient pressure to cause the facing areas of the strap portions to melt and then fuse together when oscillation is stopped.

The bottom surface of the welding head 34 is provided with teeth 40 extending transversely of the strap to enable the head to grip the strap so that the upper run of the strap will move with the welding head as it oscillates back and forth. During this time the lower run of the strap beneath the welding head is held stationary by being squeezed between member 20 and gripper 22 and by engagement with gripping element 38.

As shown in FIGS. 2 and 3, when welding head 34 moves toward the right it produces a bulge 42 in the upper run of the strap between the welding head and feed wheel 14, the feed wheel mechanism being so constructed as to permit it to rotate clockwise but not counterclockwise so that righward movement of the welding head cannot cause that portion of the strap anchored beneath the feed wheel to move. When the welding head moves toward the left the upper run of the strap bulges upward as indicated at 44 between the welding head and gripping dog 26 since, as mentioned above, the pivotal mounting of the dog is such that the strap cannot move therebeneath in the leftward direction when the dog is engaged with the strap. If the first movement of welding head after being pressed against the upper run of the strap is toward the left, bulge 44 is formed immediately. When the first movement of the welding head is toward the right a small amount of strap is pulled toward the right beneath gripping dog 26 and the bulge 44 is formed on subsequent leftward movements of the welding head. In any event, bulge 44 alternately appears and disappears as the welding head moves back and forth.

It is pointed out in the Vilcins Pat. No. 3,442,773 that the repeated flexing and bowing of the strap caused by the back and forth movement of the friction welding mechanism can result in failure of the strap due to fatigue effects. The patent indicates that the repeated flexing does not harm nylon strap but is damaging to polypropylene strap and suggests that a solution to the problem is to provide greater spacing between that movable jaw of the welding mechanism and the place where the strap is held to decrease the extent of flexing and bowing. The present invention arms not to solve the fatigue "problem" but to take advantage of it as a means of performing the necessary operation of severing the sealed strap loop from the strap supply. To this end the welding head 34 is constructed so that the side thereof facing gripping dog 26 makes an angle of at least 90° with the toothed bottom surface thereof. As shown in the drawing, and as is preferably the case, this angle is considerably greater than 90°, this being accomplished by forming the corner 46 of the welding head of a half of one of the strap gripping teeth 40, thus providing a sharp edge about which the strap must bend to form the bulge 40. On the other hand the gripping dog 26 is provided with a rounded corner 48 about which the strap bends gently during formation of bulge 44. With this arrangement the most vigorous bending of the strap during oscillation of the welding head takes place at the sharp corner 46 and the strap builds up internal heat and fails in fatigue and is severed along the line of the corner 46. As will be apparent the severing of the strap takes place right at the edge of the welded joint thus leaving no projectng tab which could accidently be snagged during moving of the strapped article. To assure that the strap does not fatigue break between the welding head 34 and the feed wheel 14, the lower corner of the welding head on the side facing the feed wheel is rounded as shown at 50, thus leaving noplace where the strap bends sharply to form the bulge 42.

It will be apparent that the basic inventive concept of causing a tensioned and sealed loop of plastic strapping to be severed from the supply of strapping closely adjacent a friction welded joint may be incorporated in apparatus varying in considerable detail from that specifically described herein.

What is claimed is:

1. The method of securing a loop of plastic strapping and severing the loop from a supply of strapping comprising overlapping an end portion of the strapping with a second portion which is between the end portion and the supply, pressing an area of the second portion against the end portion, rubbing said area of the second portion rapidly back and forth against and longitudinally of the end portion to cause the rubbed together faces of the strapping to melt, causing the second portion of the strapping to bend sharply transversely thereof about a predetermined line between said area and the supply of strapping every time said area is rubbed back and forth whereby the strapping is caused to fail in fatigue and be severed along the predetermined line, stopping the rubbing action and continuing to press the rubbed together faces together until they fuse.

2. The method set forth in claim 1 wherein the bending of the second portion of the strapping along the predetermined line is brought about by causing the strapping to alternately bulge and straighten over a relatively short distance between the said area of the second portion and the supply and by providing a sharp edge about which the strap bends to form the bulge.

3. The method set forth in claim 1 wherein the predetermined line about which the strapping is bent is located directly adjacent said area of the second portion of the strapping.

4. Apparatus for securing a loop of plastic strapping about an article and severing the loop from a supply of strapping comprising a device for pressing overlapping portions of the strapping together and rubbing the upper portion against the lower portion with a back and forth motion to melt the rubbed together faces of the strapping, said device being operable to hold the melted faces together until they fuse, means located between said device and the supply of strapping for preventing the upper portion of the strapping from moving therepast in the direction of the supply whereby the strapping alternately bulges and flattens between said means and said device as said device moves back and forth, and means causing the strapping to bend sharply about a predetermined line transversely thereof as the strapping bulges and flattens whereby the strapping becomes severed by fatigue along said predetermined line.

5. The apparatus set forth in claim 4 wherein said last mentioned means comprises a corner of at least 90° on said device, said corner being engaged with the upper portion of the strapping on the side of said device facing the means for preventing the strapping from moving therepast in the direction of the strapping supply.

6. The apparatus set forth in claim 5 wherein the means for preventing the strapping from moving therepast in the direction of the strapping supply comprises a pivotably mounted dog having a rounded corner facing said device whereby the bulging of the strapping does not produce a sharp bend at the corner of said dog.

* * * * *